United States Patent
Arunmozhi et al.

(10) Patent No.: US 11,318,916 B2
(45) Date of Patent: May 3, 2022

(54) VEHICLE MAINTENANCE

(71) Applicant: Ford Global Technologies, LLC, Dearborn, MI (US)

(72) Inventors: Ashwin Arunmozhi, Canton, MI (US); Venkatesh Krishnan, Canton, MI (US); Rashaun Phinisee, Ypsilanti, MI (US); Kunal Singh, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 525 days.

(21) Appl. No.: 16/440,244

(22) Filed: Jun. 13, 2019

(65) Prior Publication Data

US 2020/0391704 A1 Dec. 17, 2020

(51) Int. Cl.
*G05B 19/418* (2006.01)
*B60S 5/00* (2006.01)
*B64C 39/02* (2006.01)
*G06K 9/00* (2022.01)
*G06T 7/00* (2017.01)
*B25J 11/00* (2006.01)
*B25J 9/16* (2006.01)
*B25J 9/00* (2006.01)

(52) U.S. Cl.
CPC ............ *B60S 5/00* (2013.01); *B25J 9/0087* (2013.01); *B25J 9/1697* (2013.01); *B25J 11/005* (2013.01); *B64C 39/024* (2013.01); *G06K 9/0063* (2013.01); *G06T 7/0004* (2013.01); *B64C 2201/127* (2013.01); *G06T 2207/10032* (2013.01); *G06T 2207/30248* (2013.01)

(58) Field of Classification Search
CPC .......... B60R 11/04; G06T 2207/10032; G06T 2207/30248; G06T 7/0004; G06T 2207/10004; G06T 2207/20084; G06T 2207/30164; G06T 2207/30168; G06T 2207/30204; G06T 2207/30252; G06T 7/80; G06K 9/0063; G06K 9/00637; B60S 5/00; B25J 11/005; B25J 9/0087; B25J 9/1697; B64C 2201/127; B64C 39/024; B64C 2201/123
See application file for complete search history.

(56) References Cited

U.S. PATENT DOCUMENTS

| | | | |
|---|---|---|---|
| 6,338,008 B1 | 1/2002 | Kohut et al. | |
| 7,725,212 B2 * | 5/2010 | Prasse | B25J 5/007 700/214 |
| 10,037,632 B2 * | 7/2018 | Dudar | G08G 1/09623 |
| 10,650,666 B1 * | 5/2020 | Bart | G08B 29/145 |

(Continued)

FOREIGN PATENT DOCUMENTS

| | | | | |
|---|---|---|---|---|
| CN | 111212783 A * | 5/2020 | ......... | G05D 1/0088 |
| WO | 2018080425 A1 | 5/2018 | | |

*Primary Examiner* — Harry Y Oh
(74) *Attorney, Agent, or Firm* — Frank A. MacKenzie; Bejin Bieneman PLC

(57) ABSTRACT

A computer includes a processor and a memory, the memory storing instructions executable by the processor to identify a sensor of a vehicle with a robotic arm, capture a plurality of images of the sensor with an unmanned aerial vehicle, and actuate the robotic arm to perform maintenance on the sensor upon inputting the plurality of images to an image recognition program and obtaining output that the sensor requires maintenance.

20 Claims, 5 Drawing Sheets

(56) References Cited

U.S. PATENT DOCUMENTS

| | | | |
|---|---|---|---|
| 2008/0229531 A1* | 9/2008 | Takida | B60S 3/06 |
| | | | 15/53.2 |
| 2012/0262708 A1* | 10/2012 | Connolly | G05D 1/0094 |
| | | | 356/237.2 |
| 2014/0310186 A1* | 10/2014 | Ricci | G01C 21/3484 |
| | | | 705/302 |
| 2017/0129602 A1* | 5/2017 | Alduaiji | B60S 3/06 |
| 2017/0341236 A1* | 11/2017 | Patrick | B25J 13/081 |
| 2018/0040171 A1* | 2/2018 | Kundu | G07C 5/0808 |
| 2019/0055015 A1* | 2/2019 | Allard | B60R 16/0234 |
| 2019/0279447 A1* | 9/2019 | Ricci | B60R 25/00 |
| 2021/0017945 A1* | 1/2021 | Dudar | B64C 39/024 |
| 2021/0224976 A1* | 7/2021 | Yonezawa | G06T 7/73 |

* cited by examiner

VEHICLE MAINTENANCE

BACKGROUND

Vehicles, such as passenger cars, typically include sensors to collect data about a surrounding environment. The sensors can be placed on or in various parts of the vehicle, e.g., a vehicle roof, a vehicle hood, a rear vehicle door, etc. The sensors, e.g., sensor lens covers, may become dirty during operation of the vehicle. Furthermore, the sensors may become misaligned during operation. During vehicle operation, sensor data and/or environmental conditions around a vehicle can change, and such changes can affect sensor operation.

DETAILED DESCRIPTION

Figure 1:
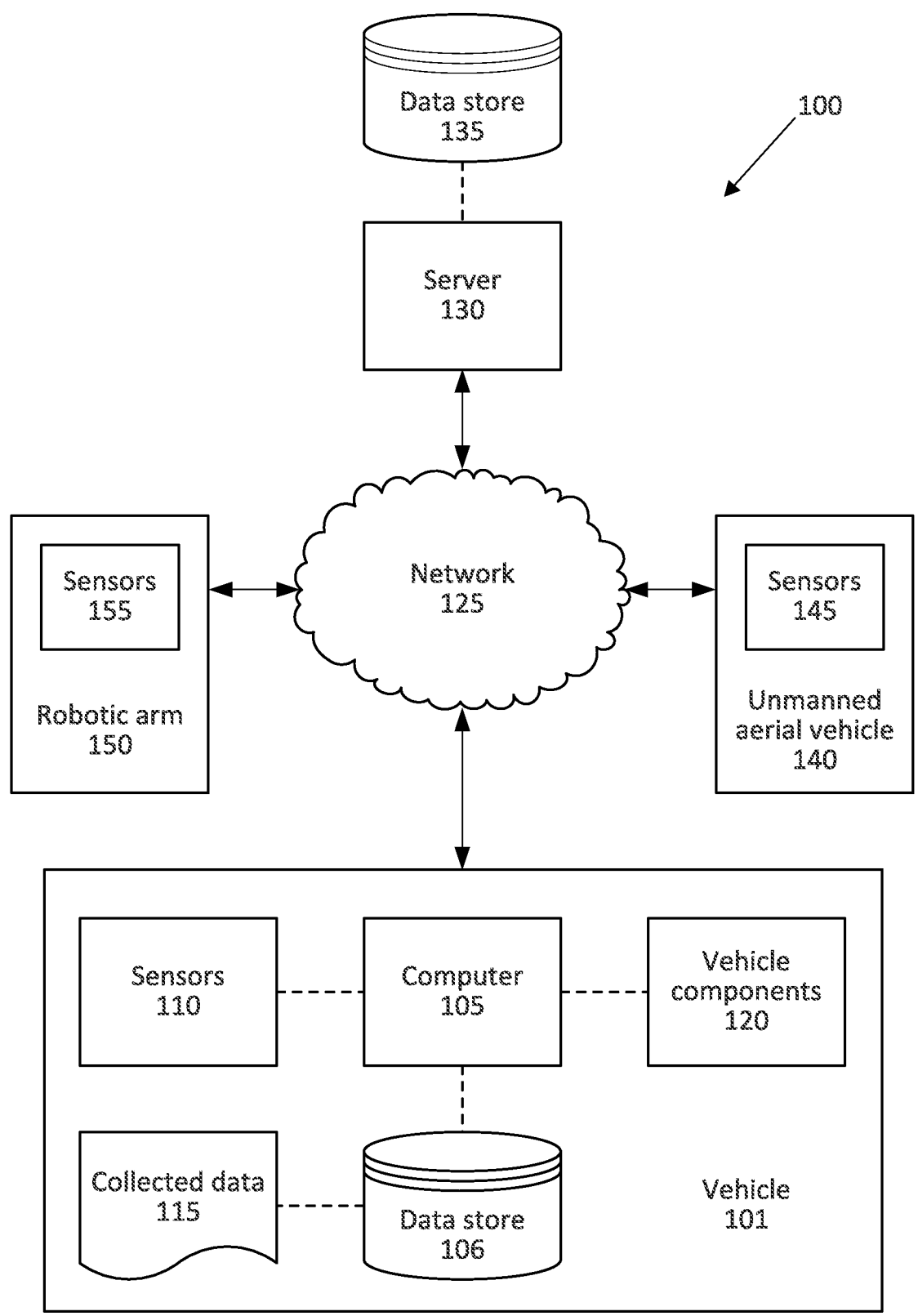
FIG. 1 is a diagram of an example system for maintaining a vehicle.

A computer includes a processor and a memory, the memory storing instructions executable by the processor to identify a sensor of a vehicle with a robotic arm, capture a plurality of images of the sensor with an unmanned aerial vehicle, and actuate the robotic arm to perform maintenance on the sensor upon inputting the plurality of images to an image recognition program and obtaining output that the sensor requires maintenance.

The instructions can further include instructions to actuate the robotic arm to replace the sensor when the image recognition program identifies a fault in the sensor.

The instructions can further include instructions to perform a calibration of the sensor with the robotic arm and the unmanned aerial vehicle.

The instructions to perform the calibration can further include instructions to move a target with the unmanned aerial vehicle into a field of view of the sensor, to collect image data of the target with the sensor, and to move the sensor with the robotic arm upon determining that the image data indicate that the sensor is misaligned.

The instructions to perform the calibration can further include instructions to project a pattern onto a wall in a field of view of the sensor with the unmanned aerial vehicle and to move the sensor with the robotic arm upon determining that image data from the sensor indicate that the sensor is misaligned.

The instructions can further include instructions to move the robotic arm to clean debris from a nozzle on the vehicle.

The instructions can further include instructions to move the unmanned aerial vehicle to a portion of the vehicle outside a movement range of the robotic arm.

The instructions can further include instructions to identify a type of the sensor with the image recognition program.

The instructions can further include instructions to, based on the identified sensor and the plurality of images, predict an expected time until replacement of the sensor.

The instructions can further include instructions to remove the sensor with the robotic arm and to capture the plurality of images of the removed sensor with the unmanned aerial vehicle.

The plurality of images can be thermal images and the instructions can further include instructions to determine whether the sensor requires maintenance upon identifying one of thermal expansion or thermal contraction of the sensor.

The instructions can further include instructions to apply a pressure gauge mounted to the robotic arm to a sensor mount of the vehicle and to determine that the sensor mount requires maintenance when a pressure reading from the pressure gauge exceeds a pressure threshold.

A method comprises identifying a sensor of a vehicle with a robotic arm, capturing a plurality of images of the sensor with an unmanned aerial vehicle, and actuating the robotic arm to perform maintenance on the sensor upon inputting the plurality of images to an image recognition program and obtaining output that the sensor requires maintenance.

The method can further include actuating the robotic arm to replace the sensor when the image recognition program identifies a fault in the sensor.

The method can further include performing a calibration of the sensor with the robotic arm and the unmanned aerial vehicle.

The method can further include moving a target with the unmanned aerial vehicle into a field of view of the sensor, collecting image data of the target with the sensor, and moving the sensor with the robotic arm upon determining that the image data indicate that the sensor is misaligned.

The method can further include projecting a pattern onto a wall in a field of view of the sensor with the unmanned aerial vehicle and moving the sensor with the robotic arm upon determining that image data from the sensor indicate that the sensor is misaligned.

The method can further include moving the robotic arm to clean debris from a nozzle on the vehicle.

The method can further include moving the unmanned aerial vehicle to a portion of the vehicle outside a movement range of the robotic arm.

The method can further include identifying a type of the sensor with the image recognition program.

The method can further include, based on the identified sensor and the plurality of images, predicting an expected time until replacement of the sensor.

The method can further include removing the sensor with the robotic arm and capturing the plurality of images of the removed sensor with the unmanned aerial vehicle.

The plurality of images can be thermal images and the method can further include determining whether the sensor requires maintenance upon identifying one of thermal expansion or thermal contraction of the sensor.

The method can further include applying a pressure gauge mounted to the robotic arm to a sensor mount of the vehicle and to determine that the sensor mount requires maintenance when a pressure reading from the pressure gauge exceeds a pressure threshold.

A system includes an unmanned aerial vehicle deployable from a station, a robotic arm mounted to the station, means for identifying a sensor of a vehicle with the robotic arm, means for capturing a plurality of images of the sensor with the unmanned aerial vehicle, and means for actuating the robotic arm to perform maintenance on the sensor upon inputting the plurality of images to an image recognition program and obtaining output that the sensor requires maintenance.

The system can further include means for actuating the robotic arm to replace the sensor when the image recognition program identifies a fault in the sensor.

The system can further include means for performing a calibration of the sensor with the robotic arm and the unmanned aerial vehicle.

The system can further include means for moving the unmanned aerial vehicle to a portion of the vehicle outside a movement range of the robotic arm.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Stations that include unmanned aerial vehicles ("UAVs") and robotic arms support maintenance of autonomous vehicles for sensors that may be misaligned or require replacement during operation of the vehicle. The autonomous vehicles can include sensor mounts that house a plurality of sensors for use during autonomous operation of the vehicle. The UAVs and robotic arms can reach the sensor mounts to maintain the sensors of the vehicle. The stations can collect data from the sensors and send the data to a server to track maintenance and movement of the vehicle. The UAVs and robotic arms can maintain and replace components of the vehicles, e.g., nozzles, air filters, etc.

FIG. 1 illustrates an example system 100 for providing maintenance to a vehicle 101. The system 100 includes a computer 105. The computer 105, typically included in the vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle propulsion, braking, and steering are controlled by the computer 105. A semi-autonomous mode is one in which at least one of vehicle propulsion, braking, and steering are controlled at least partly by the computer 105 as opposed to a human operator. In a non-autonomous mode, i.e., a manual mode, the vehicle propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 3:
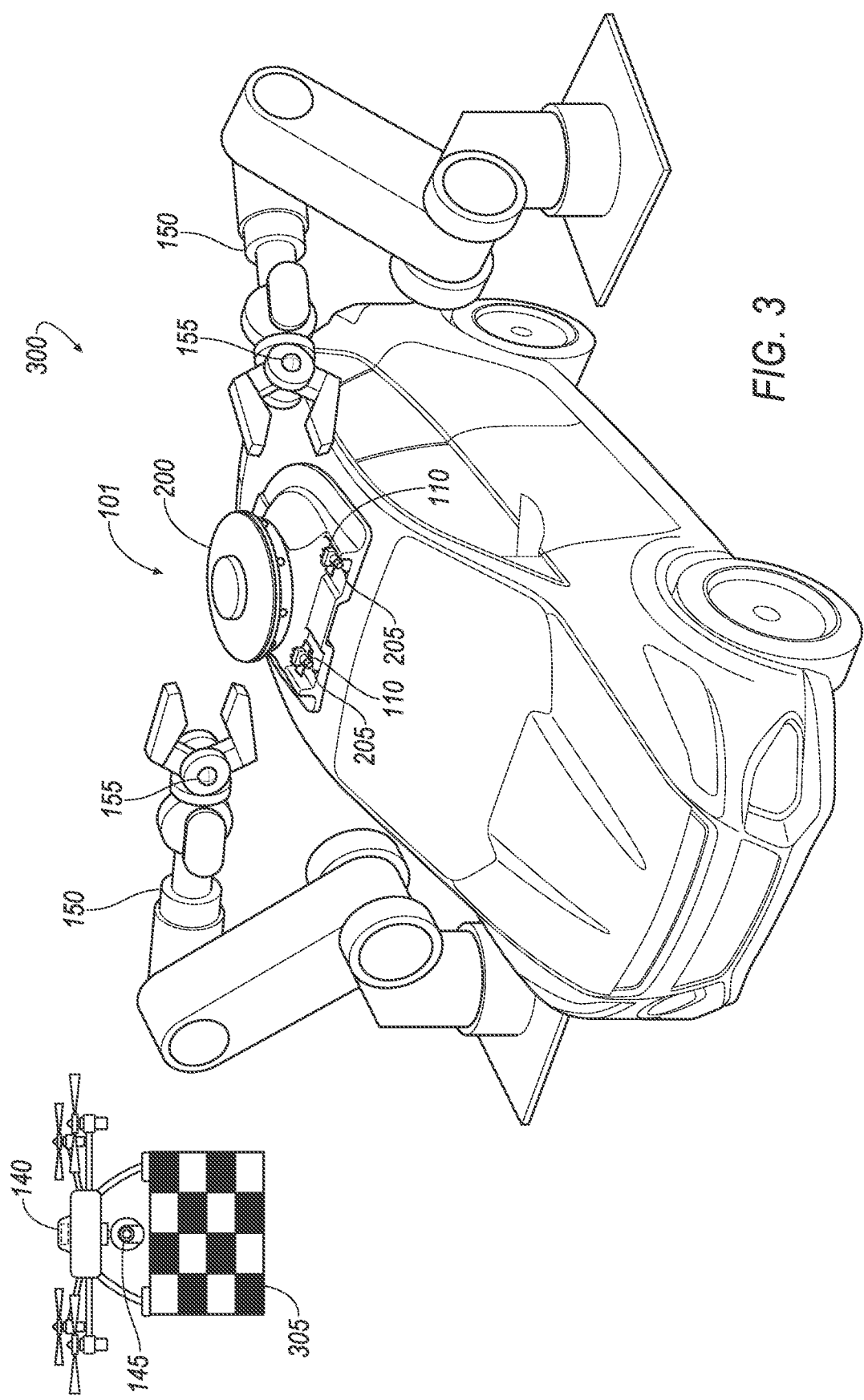
FIG. 3 is a perspective view of an example station.

The system 100 includes an unmanned aerial vehicle (UAV) 140. The UAV 140 hovers and flies around the vehicle 101 to collect image data 115 of the vehicle 101. That is, the UAV 140 can include one or more sensors 145 that collect images of one or more sensors 110 and/or components 120 of the vehicle 101. The UAV 140 as shown in FIG. 3 below is illustrated as a quadcopter, i.e., a helicopter having four propellers, but the UAV 140 may be, e.g., a helicopter having three to eight propellers, a fixed-wing drone, etc. The UAV 140 can communicate with the computer 105 and/or the server 130 over the network 125.

The system 100 includes a robotic arm 150. The robotic arm 150 can be an apparatus movable in three dimensions from a base, e.g., having a plurality of rigid segments joined by flexible joints, e.g., universal joints. The rigid segments define a movement range of the robotic arm 150, i.e., a three-dimensional space in which the robotic arm 150 can move. The robotic arm 150 can move around the vehicle 101. The robotic arm 150 can communicate with the computer 105 and/or the server 130 and/or the UAV 140 over the network 125. The robotic arm 150 can include one or more sensors 155 to collect images of the vehicle 101.

Figure 2:
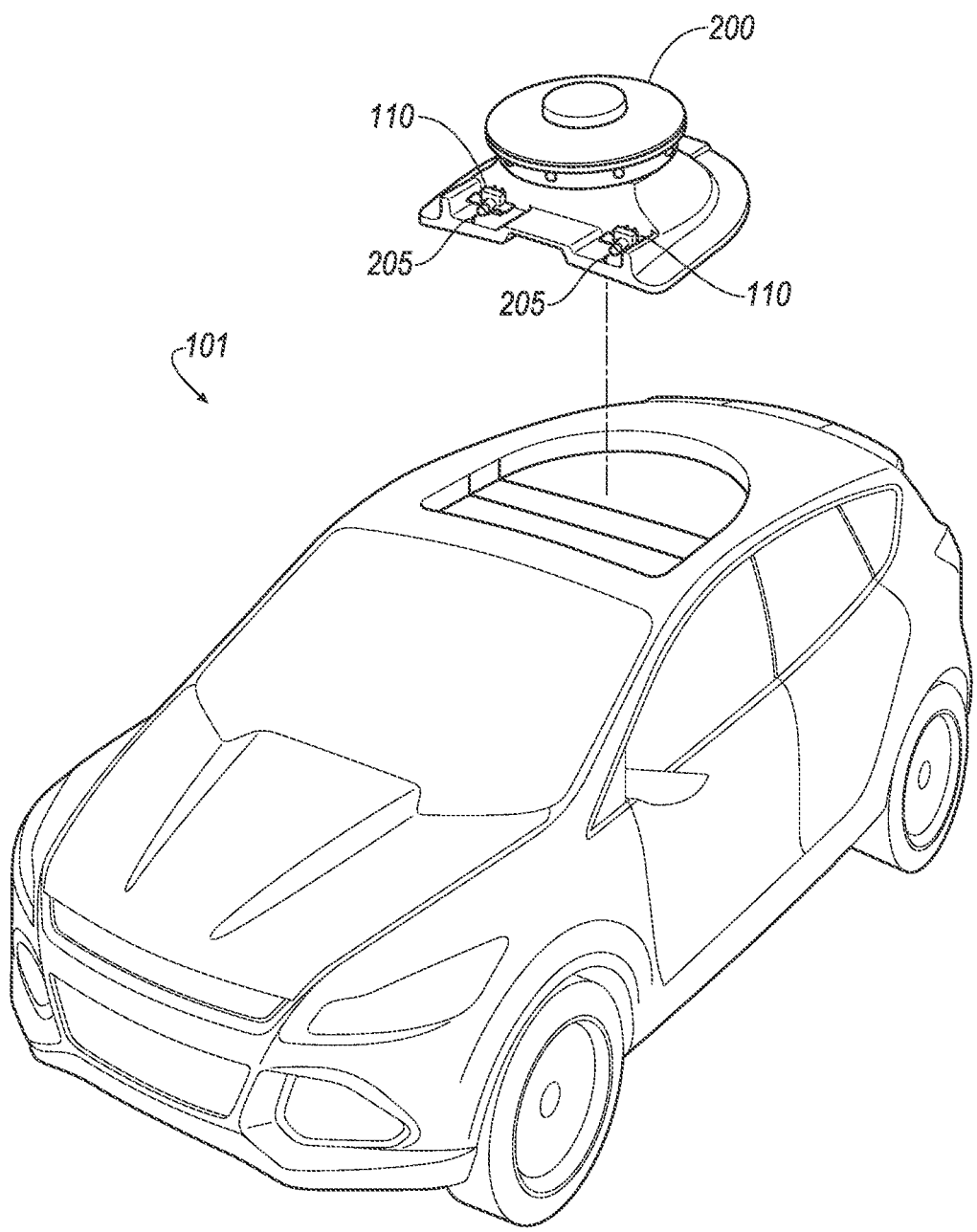
FIG. 2 is an exploded view of an example vehicle and a sensor mount.

FIG. 2 is an exploded view of an example vehicle 101. The vehicle 101 can include a sensor mount 200. The sensor mount 200 houses a plurality of sensors 110, e.g., radar, LIDAR, ultrasonic transducers, etc. The sensor mount 200 can house sensors 110 that the computer 105 actuates to operate the vehicle 101 in the autonomous and/or semi-autonomous modes. The sensor mount 200 can be mounted to a vehicle roof, e.g., in a cavity or opening shaped to receive the mount 200. In the example of FIG. 2, the sensor mount 200 is exploded from the vehicle roof. By placing the sensor mount 200 on the vehicle roof, the sensors 110 of the sensor mount 200 can collect data from an environment around the vehicle 101 without obstruction from other components 120 of the vehicle 101. The sensor mount 200 can include a nozzle 205 that can spray cleaning fluid to remove debris from one or more of the sensors 110.

FIG. 3 is a perspective view of a station 300. A station 300 is a fixed location at which the vehicle 101 can receive maintenance for one or more sensors 110 and/or components 120. The station 300 can be, e.g., a kiosk, a service location, a fuel provider, etc. The station 300 includes the UAV 140 and the robotic arm 150. FIG. 3 shows one example UAV 140, and the station 300 can include a different number of UAVs 140, e.g., two, three, etc. FIG. 3 shows two example robotic arms 150, and the station 300 can have a different number of robotic arms 150, e.g., one, three, etc. When the vehicle 101 approaches the station 300, the UAV 140 and the robotic arm 150 collect image data 115 of the sensor mount 200 to determine whether one or more sensors 110 should be provided with maintenance. That is, the UAV 140 and the robotic arm 150 can include sensors 145, 155 such as image sensors that collect images of the sensors 110 mounted to the sensor mount 200. The UAV 140 and the robotic arm 150 can collect image data 115 of components 120 of the vehicle 101. The UAV 140 can collect images of the vehicle 101 that are outside the movement range of the robotic arm 150, i.e., beyond which the robotic arm 150 can reach. To collect images of the sensor 110, the server 130 can instruct the robotic arm 150 to remove one of the sensors 110 from the sensor mount 200 and can instruct the UAV 140 to collect images of the removed sensor 110.

The server 130 can use conventional image recognition techniques, e.g., can input the images 115 from the UAV 140 and the robotic arm 150 to a machine learning program, to determine whether one or more sensors 110 and/or components 120 require maintenance. The machine learning program can be, e.g., a neural network such as a deep neural network or a recurrent neural network, a decision tree-based model, a multi-layer nonlinear model, etc. The machine learning program can be trained by inputting a plurality of reference images indicating operational sensors 110 and/or components 120 and a plurality of reference images indicating faulty sensors 110 and/or components 120. The machine learning program can be trained by adjusting coefficients of a conventional cost function to teach the machine learning program to recognize operational sensors 110 and/or components 120 and faulty sensors 110 and/or components 120 from the reference images. Then, upon receiving input of an image, the machine learning program can provide an output corresponding to the minimized cost function resulting from the image. Thus, by training the machine learning program with the reference images, the server 130 can use the machine learning program to receive image data 115 from the UAV 140 and the robotic arm 150 and to identify whether the image data 115 indicate that a sensor 110 and/or component 120 requires maintenance. Alternatively or additionally, the machine learning program can include a conventional deep neural network, a convolutional neural network, etc.

The server 130 can identify a type of the sensor 110 with the machine learning program. A "type" of sensor 110 is a classification of the sensor 110 based on the data 115 collected by the sensor 110 and/or the manner in which the sensor 110 collects data 115. Example types of sensors include, e.g., radar, LIDAR, ultrasonic transducers, camera, etc. For example, the image recognition program can be trained with reference images of different types of sensors 110. Then, upon receiving an image as input, the image recognition program can output the type of the sensor 110 corresponding to a minimized cost function, as described above. Based on the type of the sensor 110, the server 130 can determine maintenance required for the sensor 110. For example, if the machine learning program identifies the sensor 110 as a camera, the server 130 can determine whether a lens of the camera is occluded and requires cleaning with the machine learning program. That is, when training the image recognition program, the computer 105 can receive images of lenses occluded with, e.g., debris, and coefficients of a cost function can be adjusted so that the computer provides output that the lens is occluded.

The server 130 can identify a fault in one of the sensors 110 with the image recognition program. A "fault" is damage or misalignment that causes the sensor 110 to perform below a standard level of operation. When training the image recognition program, the server 130 can receive reference images of sensors 110 that include specific faults, e.g., a cracked housing, a misaligned position, an occluded lens, etc. Weights of a cost function can be adjusted so that the server 130 provides an output indicating a fault in the sensor 110 upon receiving an image of a sensor with a fault, i.e., so that the server 130 identifies the fault. Upon identifying the fault, the server 130 can identify the sensor 110 as requiring maintenance. The robotic arm 150 can replace the sensor 110 having the fault. Alternatively, the robotic arm 150 can perform maintenance on the sensor 110 to restore the sensor to the standard level of operation. For example, the robotic arm 150 can rotate the sensor 110 relative to the sensor mount 200 to adjust the field of view of the sensor 110 to collect data 115 of a specified area near the vehicle 101. In another example, the robotic arm 150 can replace a damaged portion of the sensor 110 (e.g., a lens cover). In another example, the robotic arm 150 can remove debris from the sensor 110.

The server 130 can determine whether the sensor 110 requires maintenance upon identifying a thermal change, i.e., one of thermal expansion or thermal contraction of the sensor 110. Thermal changes can expand or contract the sensor 110, causing parts of the sensor 110 to warp out of alignment. The UAB 140 and/or the robotic arm 150 can collect thermal images 115 of the sensor 110, i.e., infrared images indicating a surface temperature of the sensor 110. The server 130 can apply the image recognition program to images of the sensor 110 to identify thermal expansion or thermal contraction. For example, the machine learning program can be trained with reference images of sensors 110 that are thermally expanded and reference images of sensors 110 that are thermally contracted such that, upon inputting an image of a sensor 110, the image recognition program can output that the sensor 110 is thermally expanded, thermally contracted, or thermally neutral. Upon identifying that the sensor 110 is thermally expended or thermally contracted, the server 130 can actuate the robotic arm 150 to perform maintenance on the sensor 110. For example, the server 130 can actuate the robotic arm 150 to replace the sensor 110. In another example, the server 130 can actuate the robotic arm 150 to rotate the sensor 110 to adjust a field of view of the sensor 110 based on the thermal expansion or thermal contraction.

The server 130 can predict an expected life of the sensors 110. The "expected life" of a sensor 110 is a prediction of an amount of time that the sensor 110 will remain operational under conventional operation. That is, the expected life of the sensor 110 is the expected time that the sensor 110 will collect data 115 at precision and accuracy thresholds as described below set by, e.g., a manufacturer, before requiring replacement. The server 130 can predict the expected life of the sensors 110 by identifying an installation date of the sensor 110 from, e.g., a barcode and/or other code printed on the sensor 110, a message from the computer 105, etc., and identifying a type of the sensor 110. That is, each type of sensor 110 can have a predicted lifetime, e.g., 10 years, and the server 130 can store a lookup table or the like that lists each predicted lifetime for each type of sensor 110. Upon identifying the installation date of the sensor 110 and the type of the sensor 110, the server 130 can determine the expected life of the sensor 110 by adding the predicted lifetime to the installation date and subtracting the current date. If the expected life of the sensor 110 is below a threshold, e.g., based on a manufacturer recommended replacement schedule, the server 130 can instruct the robotic arm 150 to replace the sensor 110. For example, a manufacturer can recommend replacing the sensor 110 when the expected life is less than 1 year, and the server 130 can instruct the robotic arm 150 to replace sensors 110 having respective expected lives less than 1 year.

The server 130 can actuate the robotic arm 150 to perform maintenance on the sensors 110 and/or components 120. For example, the server 130 can actuate the robotic arm 150 to remove sensors 110 identified as requiring maintenance from the sensor mount 200 and to install replacement sensors 110 to the sensor mount 200. In another example, the robotic arm 150 can move the sensors 110 in the sensor mount 200, e.g., the robotic arm 150 can rotate one or more of the sensors 110 to adjust a field of view of the sensor 110. In another example, the robotic arm 150 can blow air to remove debris from the sensors 110. In another example, the robotic arm 150 can replace a faulty component 120, e.g., an air filter.

The server 130 can actuate the robotic arm 150 to clean debris from the nozzle 205 on the sensor mount 200. When the nozzle 205 has debris, the nozzle 205 may not spray as much cleaning fluid onto the sensors 110 as a clean nozzle 205. The server 130 can input images of the nozzle 205 into the machine learning program that is trained with reference images of nozzles 205 with debris and nozzles 205 without debris and outputs an indication of whether the nozzle 205 has debris. Upon determining that the nozzle 205 has debris, the server 130 can actuate the robotic arm 150 to remove the debris from the nozzle 205. For example, the robotic arm 150 can include a brush that, when applied to the nozzle 205, removes the debris.

The server 130 can instruct the robotic arm 150 to determine an internal pressure of tubes in the sensor mount 200 connected to the nozzle 205. When the nozzle 205 has debris, the debris can increase pressure in tubes of the sensor mount 200. The robotic arm 150 can include a pressure gauge. The server 130 can instruct the robotic arm 150 to apply the pressure gauge to the tubes of the sensor mount 200. The server 130 can determine that the sensor mount 200 requires maintenance when a pressure reading from the pressure gauge exceeds a pressure threshold determined based on, e.g., a maximum pressure that a fluid pump can produce, a manufacturer recommended maximum pressure, etc. The server 130 can actuate the robotic arm 150 to remove the sensor mount 200 to perform maintenance.

The UAV 140 and the robotic arm 150 can perform a calibration of one of the sensors 110. In this context, a "calibration" is a process to adjust a sensor 110 such that the data 115 collected by the sensor 110 are within respective predetermined thresholds for at least one of precision and accuracy. In this context, "precision" is a measure of closeness of repeated measurements of data 115 to previous measurements of data 115 and "accuracy" is a measure of closeness of measurements of data 115 to a reference or intended target. That is, precision of a sensor 110 is related to a measurement resolution and accuracy of a sensor 110 is related to a measurement range. That is, the sensor 110 can be misaligned, out of focus, etc., and may collect data 115 that are not accurate and/or precise within a threshold set by, e.g., a manufacturer. A sensor 110 is "aligned" when the data 115 collected by the sensor 110 are within accuracy and precision thresholds, e.g., set by the manufacturer, and the sensor 110 is "misaligned" when the data 115 collected are outside at least one of the accuracy or precision thresholds. For example, an accuracy threshold for a camera can be a maximum angle difference between a current field of view of the camera and a predetermined field of view set by the manufacturer. That is, if the camera is rotated away from the predetermined field of view, the images collected by the camera can be inaccurate, i.e., the images may lack data 115 of an area around the vehicle 101 that the camera was intended to view. The server 130 can determine that the camera is rotated away from the predetermined field of view by identifying a location of a reference point in the images that differs from the location of the reference point in predetermined reference images that are in the predetermined field of view. The reference point can be, e.g., a specified location on a surface of the vehicle 101. The accuracy threshold can be, e.g., 5 degrees. That is, if the field of view of the camera is more than 5 degrees away from the predetermined field of view, the server 130 can determine that the camera requires calibration. In another example, a precision threshold for a camera can be a pixel resolution of images collected by the camera, i.e., 2560×1440 pixels. That is, if the camera collects images that have less than 2560× 1440 pixels, the server 130 can determine that the camera requires calibration. By performing the calibration, the UAV 140 and the robotic arm 150 can restore the sensor 110 to collect accurate and/or precise data 115 for use by the computer 105 to operate the vehicle 101. Upon determining that the sensor 110 is misaligned based on the image data 115 collected by the UAV 140 and/or the robotic arm 150, the server 130 can instruct the UAV 140 and the robotic arm 150 to perform the calibration of the sensor 110.

To perform the calibration, the UAV 140 can hover at a predetermined distance from the sensor 110 displaying a target 305 in the field of view of the sensor 110. The target 305 can be a specified pattern, e.g., a checkerboard pattern printed on a board held by the UAV 140. Alternatively, the UAV 140 can actuate a projector attached to the UAV 140 to display the target 305 as a pattern on a wall. The server 130 can instruct the sensor 110 to collect image data 115 of the target 305 and can compare the image data 115 to reference images with precise and accurate data 115 for the sensor 110. The server 130 can determine a difference between the collected image data 115 and the reference images, e.g., with a conventional image processing algorithm that applies a blur-detection algorithm such as a Gaussian Laplace filter to the collected image data 115 and compares a distribution of pixels of the collected image data 115 to a distribution of pixels of the reference images. Based on the output from the image processing algorithm, the server 130 can actuate the robotic arm 150 to adjust the sensor 110. For example, the robotic arm 150 can rotate the sensor 110 by a specified angle, the sensor 110 can collect image data 115 of the target 305, and the server 130 can apply the image processing algorithm to the image data 115.

The server 130 can instruct the robotic arm 150 to rotate the sensor 110 until the image processing algorithm outputs a value indicating that the accuracy and/or precision of the image data 115 from the sensor 110 are within a threshold of the reference images 115. For example, the threshold can be a blur threshold determined based on conventional data quality standards and/or thresholds set by a sensor 110 manufacturer, and the server 130 can instruct the robotic arm 150 to rotate the sensor 110 until the amount of blur of the image data 115 from the sensor 110 determined by the image processing algorithm is below the blur threshold. The server 130 can instruct the robotic arm 150 to rotate the sensor 110 by a predetermined angle (e.g., 10 degrees). In another example, the server 130 can instruct the robotic arm 150 to move the sensor 110 vertically by a predetermined distance (e.g., 10 cm) determined by a calibration test standard to adjust the field of view of the sensor 110. Alternatively, the server 130 can determine the accuracy and/or precision of the image data 115 from the sensor 110 with a different conventional data quality algorithm.

Figure 4:
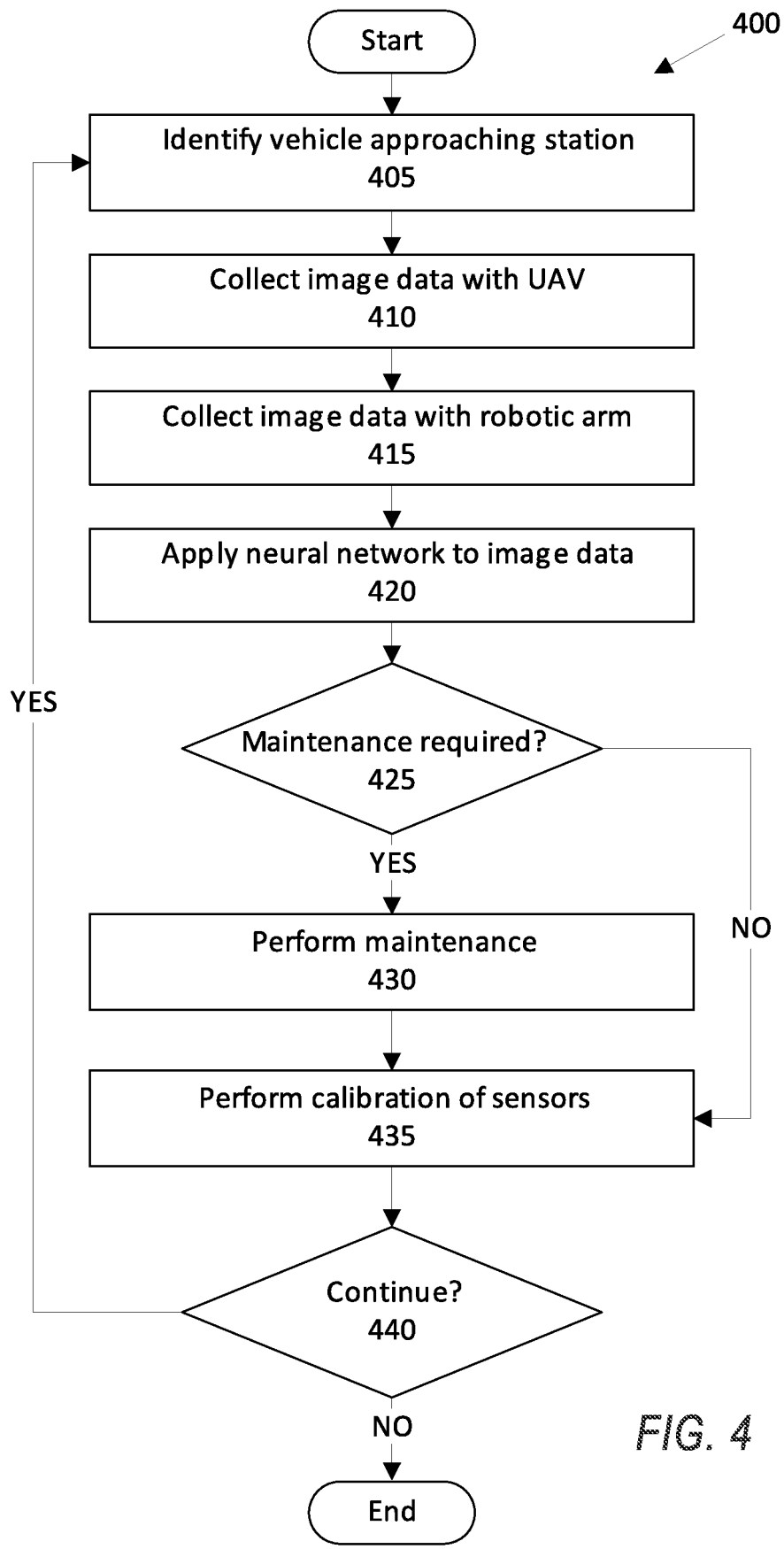
FIG. 4 is a diagram of an example process for maintaining the vehicle.

FIG. 4 is a diagram of an example process 400 for identifying a sensor 110 and/or a component 120 that requires maintenance. The process 400 begins in a block 405, in which the server 130 identifies a vehicle 101 approaching a station 300. The server 130 can actuate a camera 145, 155 on a UAV 140 and/or a robotic arm 150 to detect the vehicle 101 approaching the station 300. Alternatively or additionally, the computer 105 can send a message to the server 130 that the vehicle 101 is approaching the station 300.

Next, in a block 410, the server 130 actuates one or more sensors 145 mounted to the UAV 140 to collect image data 115 of the vehicle 101. The UAV 140 can hover around or over the vehicle 101 to collect images of sensors 110, e.g., sensors 110 mounted to the sensor mount 200, and components 120. The UAV 140 can move to areas of the vehicle 101 that the robotic arm 150 cannot reach to collect image data 115. The UAV 140 can collect data 115 of the sensor mount 200.

Next, in a block 415, the server 130 actuates one or more sensors 155 mounted to the robotic arm 150 to collect image data 115 of the vehicle 101. The robotic arm 150 can collect image data 115 of a sensor mount 200 of the vehicle 101, including images of sensors 110 mounted to the sensor mount 200. The robotic arm 150 can collect image data 115 of one or more components 120 of the vehicle 101.

Next, in a block 420, the server 130 inputs the image data 115 from the UAV 140 and the robotic arm 150 to an image recognition application such as a machine learning program. As described above, a machine learning program can be trained to identify sensors 110 and/or components 120 that require maintenance based on reference images of operational sensors 110 and/or components 120 and reference images of sensors 110 and/or components 120 that require maintenance.

Next, in a block 425, the server 130 determines whether one or more sensors 110 and/or components 120 should receive maintenance. Based on output from the machine learning program, as described above, the server 130 can identify one or more sensors 110 to receive maintenance. If no sensors 110 and/or components 120 are to receive maintenance, the process 400 continues in a block 435. Otherwise, the process 400 continues in a block 430.

In the block 430, the server 130 actuates the UAV 140 and the robotic arm 150 to perform maintenance on the sensors 110 and/or components 120. For example, the robotic arm 150 can replace sensors 110 that are not operational. In another example, the server 130 can actuate a cleaning component mounted to the robotic arm 150 to remove debris from a nozzle 205 of the sensor mount 200. In another example, the server 130 can actuate the robotic arm 150 to replace an air filter 120.

In the block 435, the server 130 performs calibration of the sensors 110. As described above, the server 130 can actuate the UAV 140 and the robotic arm 150 to perform a calibration of one or more sensors 110 so that the sensors 110 can collect data 115 within predetermined accuracy and/or precision thresholds. For example, the server 130 can perform the example calibration shown in the process 500 of FIG. 5 below.

Next, in a block 440, the server 130 determines whether to continue the process 400. For example, if the server 130 determines that there are no further sensors 110 of the vehicle 101 that require maintenance, the server 130 can determine not to continue. If the server 130 determines to continue, the process 400 returns to the block 405. Otherwise, the process 400 ends.

Figure 5:
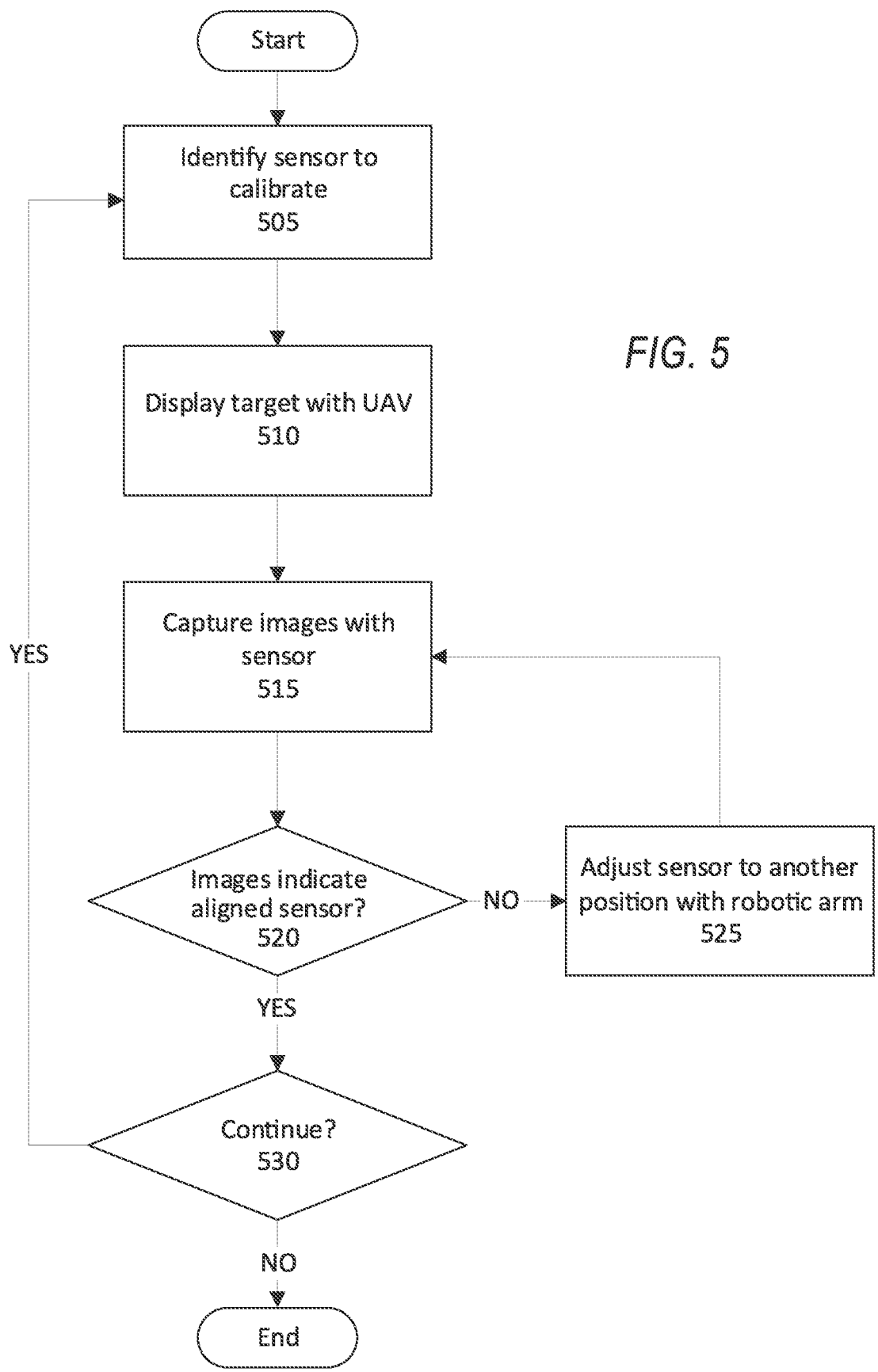
FIG. 5 is a diagram of an example process for calibrating a sensor.

FIG. 5 is a diagram of an example process 500 for calibrating a sensor 110. The process 500 begins in a block 505 in which the server 130 identifies a sensor 110 to calibrate. As described above, the server 130 can identify the sensor 110 to calibrate based on output from the machine learning program.

Next, in a block 510, the server 130 instructs the UAV 140 to display a target 305. As described above, the UAV 140 can display a target 305 in the field of view of the sensor 110 that is a board with a pattern printed thereupon. Alternatively, the UAV 140 can project a pattern onto a wall in the field of view of the sensor 110 as the target 305. The pattern can be a predetermined pattern used in a conventional calibration process, e.g., a checkerboard pattern.

Next, in a block 515, the server 130 instructs the computer 105 to collect images of the target 305 with the sensor 110.

Upon collecting the images of the target 305, the computer 105 transmits the images to the server 130 over the network 125.

Next, in a block 520, the server 130 determines whether the images from the sensor 110 indicate that the sensor 110 is aligned. As described above, the server 130 can use a conventional data quality technique and/or a machine learning program that receives the images as input and provides an output indicating whether the sensor 110 is collecting data 115 within predetermined accuracy and/or precision thresholds, such as field of view angle thresholds and/or resolution thresholds set by a manufacturer as described above. For example, the server 130 can determine whether the images capture the field of view determined by a manufacturer by identifying a location of a reference point in the images and comparing the location to a location of the reference point in reference images in the predetermined field of view. In another example, the server 130 can determine whether the image processing algorithm outputs a value indicating that the accuracy and/or precision of the image data 115 from the sensor 110 are within a respective threshold of the reference images, e.g., an accuracy threshold of 5 degrees, a precision threshold of 2560×1440 pixels, etc. If the images indicate that the sensor 110 is aligned, the process 500 continues in a block 530. Otherwise, the process 500 continues in a block 525.

In the block 525, the server 130 instructs the robotic arm 150 to adjust the sensor 110 to a different position. For example, the server 130 can instruct the robotic arm 150 to rotate the sensor 110 by a predetermined amount (e.g., 10 degrees) to adjust the field of view of the sensor 110. In another example, the server 130 can instruct the robotic arm 150 to raise or lower the sensor 110 by a predetermined distance (e.g., 10 cm) to adjust the field of view of the sensor 110. The process 500 then returns to the block 515 to collect more images.

In the block 530, the server 130 determines whether to continue the process 500. For example, the server 130 can determine to continue the process 500 upon identifying another sensor 110 that requires calibration. If the server 130 determines to continue, the process 500 returns to the block 505. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   identify a sensor of a vehicle with a robotic arm;
   capture a plurality of images of the sensor with an unmanned aerial vehicle; and
   actuate the robotic arm to perform maintenance on the sensor upon inputting the plurality of images to an image recognition program and obtaining output that the sensor requires maintenance.

2. The system of claim 1, wherein the instructions further include instructions to actuate the robotic arm to replace the sensor when the image recognition program identifies a fault in the sensor.

3. The system of claim 1, wherein the instructions further include instructions to perform a calibration of the sensor with the robotic arm and the unmanned aerial vehicle.

4. The system of claim 3, wherein the instructions to perform the calibration further include instructions to move a target with the unmanned aerial vehicle into a field of view of the sensor, to collect image data of the target with the sensor, and to move the sensor with the robotic arm upon determining that the image data indicate that the sensor is misaligned.

5. The system of claim 3, wherein the instructions to perform the calibration further include instructions to project a pattern onto a wall in a field of view of the sensor with the unmanned aerial vehicle and to move the sensor with the robotic arm upon determining that image data from the sensor indicate that the sensor is misaligned.

6. The system of claim 1, wherein the instructions further include instructions to move the robotic arm to clean debris from a nozzle on the vehicle.

7. The system of claim 1, wherein the instructions further include instructions to move the unmanned aerial vehicle to a portion of the vehicle outside a movement range of the robotic arm.

8. The system of claim 1, wherein the instructions further include instructions to identify a type of the sensor with the image recognition program.

9. The system of claim 8, wherein the instructions further include instructions to, based on the identified sensor and the plurality of images, predict an expected time until replacement of the sensor.

10. The system of claim 1, wherein the instructions further include instructions to remove the sensor with the robotic arm and to capture the plurality of images of the removed sensor with the unmanned aerial vehicle.

11. The system of claim 1, wherein the plurality of images are thermal images and the instructions further include instructions to determine whether the sensor requires maintenance upon identifying one of thermal expansion or thermal contraction of the sensor.

12. The system of claim 1, wherein the instructions further include instructions to apply a pressure gauge mounted to the robotic arm to a sensor mount of the vehicle and to determine that the sensor mount requires maintenance when a pressure reading from the pressure gauge exceeds a pressure threshold.

13. A method, comprising:
identifying a sensor of a vehicle with a robotic arm;
capturing a plurality of images of the sensor with an unmanned aerial vehicle; and
actuating the robotic arm to perform maintenance on the sensor upon inputting the plurality of images to an image recognition program and obtaining output that the sensor requires maintenance.

14. The method of claim 13, further comprising actuating the robotic arm to replace the sensor when the image recognition program identifies a fault in the sensor.

15. The method of claim 13, further comprising performing a calibration of the sensor with the robotic arm and the unmanned aerial vehicle.

16. The method of claim 13, further comprising moving the unmanned aerial vehicle to a portion of the vehicle outside a movement range of the robotic arm.

17. A system, comprising:
an unmanned aerial vehicle deployable from a station;
a robotic arm mounted to the station;
means for identifying a sensor of a vehicle with the robotic arm;
means for capturing a plurality of images of the sensor with the unmanned aerial vehicle; and
means for actuating the robotic arm to perform maintenance on the sensor upon inputting the plurality of images to an image recognition program and obtaining output that the sensor requires maintenance.

18. The system of claim 17, further comprising means for actuating the robotic arm to replace the sensor when the image recognition program identifies a fault in the sensor.

19. The system of claim 17, further comprising means for performing a calibration of the sensor with the robotic arm and the unmanned aerial vehicle.

20. The system of claim 17, further comprising means for moving the unmanned aerial vehicle to a portion of the vehicle outside a movement range of the robotic arm.

* * * * *